(12) United States Patent
Dowedeit

(10) Patent No.: US 7,792,916 B2
(45) Date of Patent: Sep. 7, 2010

(54) MANAGEMENT OF CLUSTER-WIDE RESOURCES WITH SHARED VARIABLES

(75) Inventor: Bernd Dowedeit, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 12/254,055

(22) Filed: Oct. 20, 2008

(65) Prior Publication Data

US 2010/0100655 A1   Apr. 22, 2010

(51) Int. Cl.
*G06F 15/16* (2006.01)
*G06F 15/167* (2006.01)
*G06F 15/173* (2006.01)

(52) U.S. Cl. .................. 709/214; 709/212; 709/213; 709/225; 709/229

(58) Field of Classification Search ............... 709/212, 709/213, 214, 225, 229; 711/152; 712/30, 712/245; 713/182; 718/102, 104
See application file for complete search history.

(56) References Cited

U.S. PATENT DOCUMENTS

| | | | | |
|---|---|---|---|---|
| 6,463,527 B1* | 10/2002 | Vishkin | ................. | 712/245 |
| 6,795,901 B1* | 9/2004 | Florek et al. | ................. | 711/152 |
| 6,912,621 B2* | 6/2005 | Harris | ................. | 709/212 |
| 7,107,267 B2* | 9/2006 | Taylor | ................. | 713/182 |
| 7,353,515 B1* | 4/2008 | Ton et al. | ................. | 718/102 |
| 7,523,293 B2* | 4/2009 | Vishkin | ................. | 712/30 |
| 2003/0145210 A1* | 7/2003 | Taylor | ................. | 713/182 |
| 2003/0200398 A1* | 10/2003 | Harris | ................. | 711/152 |
| 2006/0005197 A1* | 1/2006 | Saha et al. | ................. | 718/104 |

OTHER PUBLICATIONS

IBM, "z/OS availability by design", http://www.-03.ibm.com/systems/z/os/zos/support/zos_availability.html, (Oct. 29, 2008).

* cited by examiner

*Primary Examiner*—Quang N. Nguyen
(74) *Attorney, Agent, or Firm*—Jeffrey S. LaBaw

(57) ABSTRACT

The number of concurrent systems locks supported on a Sysplex is limited. Since persistent system locks may not be released for a long time, the limit may be reached resulting in outage periods. Access to resources may be managed through shared variables across a cluster of computing systems. Processes running on the cluster can use shared variables that are either exclusive or non-exclusive. An exclusive shared variable associates a resource with a process that has exclusive control of the resource. Since each exclusive shared variable is unique across the cluster, another application cannot create a second exclusive shared variable to control the resource. There is no limit on the number of exclusive shared variables that can be created on a cluster. Using exclusive shared variables instead of persistent system locks can prevent a system from reaching the limit of concurrent system locks while allowing processes exclusive use of resources.

18 Claims, 8 Drawing Sheets

US 7,792,916 B2

MANAGEMENT OF CLUSTER-WIDE RESOURCES WITH SHARED VARIABLES

BACKGROUND

Embodiments of the inventive subject matter generally relate to the field of computer systems, and, more particularly, to resource management in computer systems.

An IBM® Systems Complex ("Sysplex") is multiple virtual and/or physical computer systems (e.g., multiple System/390 processors and/or multiple logical partitions on a single processor) presented as a single system. The multiple computer systems share a Sysplex name and resources to present as a single system. Although presented as a single system, the multiple computer systems can run multiple instances of an operating system or different operating systems. Applications running on a Sysplex may request system locks for resources that allow exclusive access to the resources. Some applications may hold a large number of system locks for a very long time (e.g., days, weeks or months). This is called a persistent system lock. When a large number of persistent system locks are held, it is possible to reach a limit of concurrent system locks. If the limit of current system locks is reached, applications will experience outages in the ability to gain exclusive access to resources.

SUMMARY

Embodiments include a method directed to a first agent receiving a request for exclusive write access to a resource, wherein the request is received from a first process running in a first process group, wherein the first agent is a member of a sharing group. A temporary system lock is obtained on the resource for the first process. An exclusive shared variable is created for the first process, wherein the exclusive shared variable is associated with the resource and the first process at least initially has exclusive write access to the resource associated with the exclusive shared variable while allowing processes in a second process group read access to the exclusive shared variable. A replication message is sent to a second agent associated with the second process group to cause the second agent to create a copy of the exclusive shared variable, wherein the second agent is also a member of the sharing group. A commitment is received from the second agent that indicates that the second agent has successfully created the copy of the exclusive shared variable. The temporary system lock is released. The first agent notifies the first process that exclusive write access to the resource has been granted.

BRIEF DESCRIPTION OF THE DRAWINGS

The present embodiments may be better understood, and numerous objects, features, and advantages made apparent to those skilled in the art by referencing the accompanying drawings.

FIG. 3 depicts a flowchart of operation that continues from the flowchart depicted by FIG. 2.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a Sysplex, embodiments may be implemented in other clustered computer systems. In other instances, well-known instruction instances, protocols, structures and techniques have not been shown in detail in order not to obfuscate the description.

There is a limit to the number of concurrent systems locks supported on a Sysplex. Since persistent system locks may not be released for a very long time, the limit may be reached resulting in long outage periods. Access to resources may be managed through shared variables across a cluster of computing systems. A cluster of computing systems ("cluster") comprises multiple computing systems, whether physical or virtual, that can be used as if a single computing system. The computing systems of a cluster may be located within a single physical unit (e.g., a mainframe) and/or located in different physical locations. Processes running on the cluster can use shared variables that are either exclusive or non-exclusive. An exclusive shared variable associates a resource with a process that has exclusive control of the resource. For example, a process requests exclusive access to a storage device. No other processes can write to the storage device, but they may be able to read contents of the storage device depending on read privileges. Since each exclusive shared variable is unique across the cluster, another process cannot create a second exclusive shared variable to control the resource. There is no limit on the number of exclusive shared variables that can be created on a cluster. Using exclusive shared variables instead of persistent system locks can prevent a system from reaching the limit of concurrent system locks while allowing processes exclusive use of resources.

Figure 1:
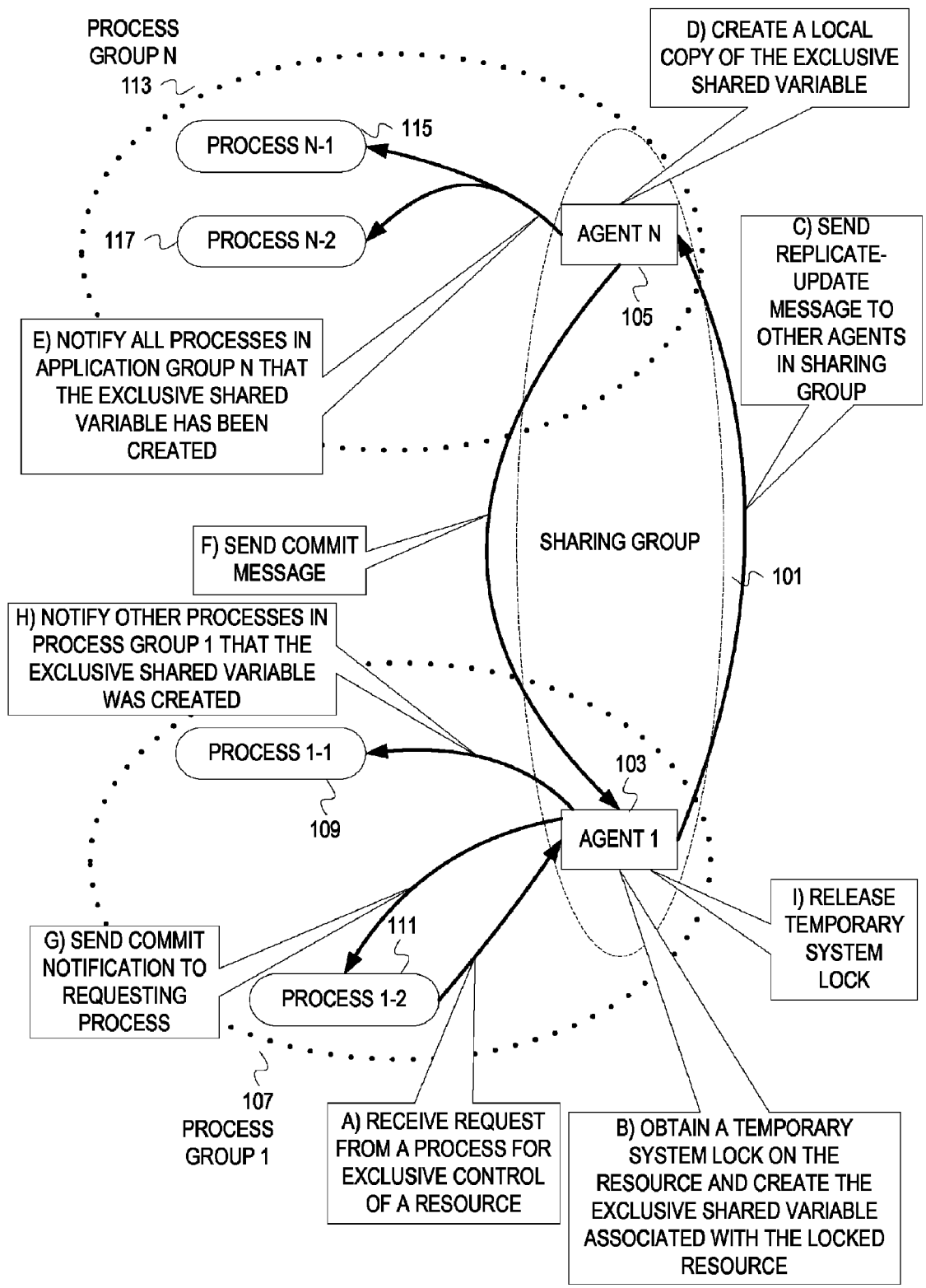
FIG. 1 is an example conceptual diagram of creating exclusive shared variables.

FIG. 1 is an example conceptual diagram of creating exclusive shared variables. In FIG. 1, a computing system cluster comprises two process groups, process group 1 107 and process group N 1 13. A process group is a set of one or more processes managed by an agent. In the computing system cluster, a process in a group may be running on one or more computing systems. An agent of a process group creates exclusive shared variables for the processes in its process group, and notifies agents outside its process group when exclusive shared variables are created. The process group 1 107 comprises a process 1-1 109, a process 1-2 111, and an agent 1 103. The process group N 113 comprises a process N-1 115 a process N-2 117 and an agent N 105. The process group N 113 represents the Nth process group in the computing system cluster. Agent 1 103 and agent N 105 make up a sharing group 101. A sharing group comprises one or more agents that are communicatively coupled. A sharing group also comprises an event service and a logically shared variable pool. The event service notifies the agents in the sharing group of events. Examples of events are a new agent joining the sharing group, an agent leaving the sharing group, etc. A logically shared variable pool is a set of exclusive and non-exclusive shared variables created by agents in the sharing group. Each agent maintains shared variables it created for processes in its process group and copies of variables created by other agents in the sharing group.

At stage A, agent 1 103 receives a request from process 1-2 111 for exclusive control of a resource. A resource associated with a variable may be virtual or physical. Examples of resources include memory locations, storage devices, portions of storage, tape drives, network interfaces, a list, a queue, a control block, etc. Process 1-2 111 can make the request by calling a programming interface (API) function, sending a message in accordance with a messaging mechanism, etc.

At stage B, agent 1 103 obtains a temporary system lock on the resource and creates the exclusive shared variable associated with the locked resource. The temporary system lock ensures that other processes do not modify the resource while the exclusive shared variable is being created.

At stage C, agent 1 103 sends a replicate-update message to other agents in the sharing group. In this example, agent 1 103 sends the replicate-update message to agent N 105. The purpose of the replicate-update message is to notify agents that a shared variable has been created or modified. In this case, the replicate-update message notifies agent N 105 that the exclusive shared variable has been created. The replicate-update message contains information about the exclusive shared variable that allows agent N 105 to make a local copy of the exclusive shared variable.

At stage D, agent N 105 creates a local copy of the exclusive shared variable.

At stage E, agent N 105 notifies process N-1 115 and process N-2 117 in process group N that the exclusive shared variable has been created.

At stage F, agent N 105 sends a commit message to agent 1 103. The commit message notifies the agent 1 103 that agent N 105 successfully created the local copy of the exclusive shared variable for process group N 113.

At stage G, agent 1 103 sends a commit notification to process 1-2 111. The commit notification informs process 1-2 111 that it has been granted exclusive access to the resource because the exclusive shared variable was successfully created across the entire sharing group 101.

At stage H, agent 1 103 notifies process 1-1 109 in process group 107 that the exclusive shared variable was created. Notification can be sent to all processes associated with each agent in the sharing group when a shared variable is created. A process may or may not disregard the notification. In some cases, a first process may use data written to a resource by a second process that has an exclusive shared variable associated with the resource. For example, the first process may collect weather data that is written into a block memory of memory comprising the resource. The second process may be a weather reporting application that reads and reports weather data written to the memory block by the first process. In addition, sending a notification that a shared variable was created may depend on a property of the shared variable. For example, a notification property of a shared variable may be set to yes or no to indicate if notification should be sent when the shared variable is created. A notification message will not be sent if the notification property is set to no. Using a property to indicate if notification messages should be sent reduces message traffic.

At stage I, agent 1 103 releases the temporary system lock. The temporary system lock is no longer needed to protect the resource because the exclusive shared variable has been successfully created.

Although FIG. 1 describes an agent creating an exclusive shared variable, agents can also create non-exclusive shared variables with similar techniques. Subsequent figures illustrate creating a non-exclusive shared variable, as well as an exclusive shared variable.

Figure 2:
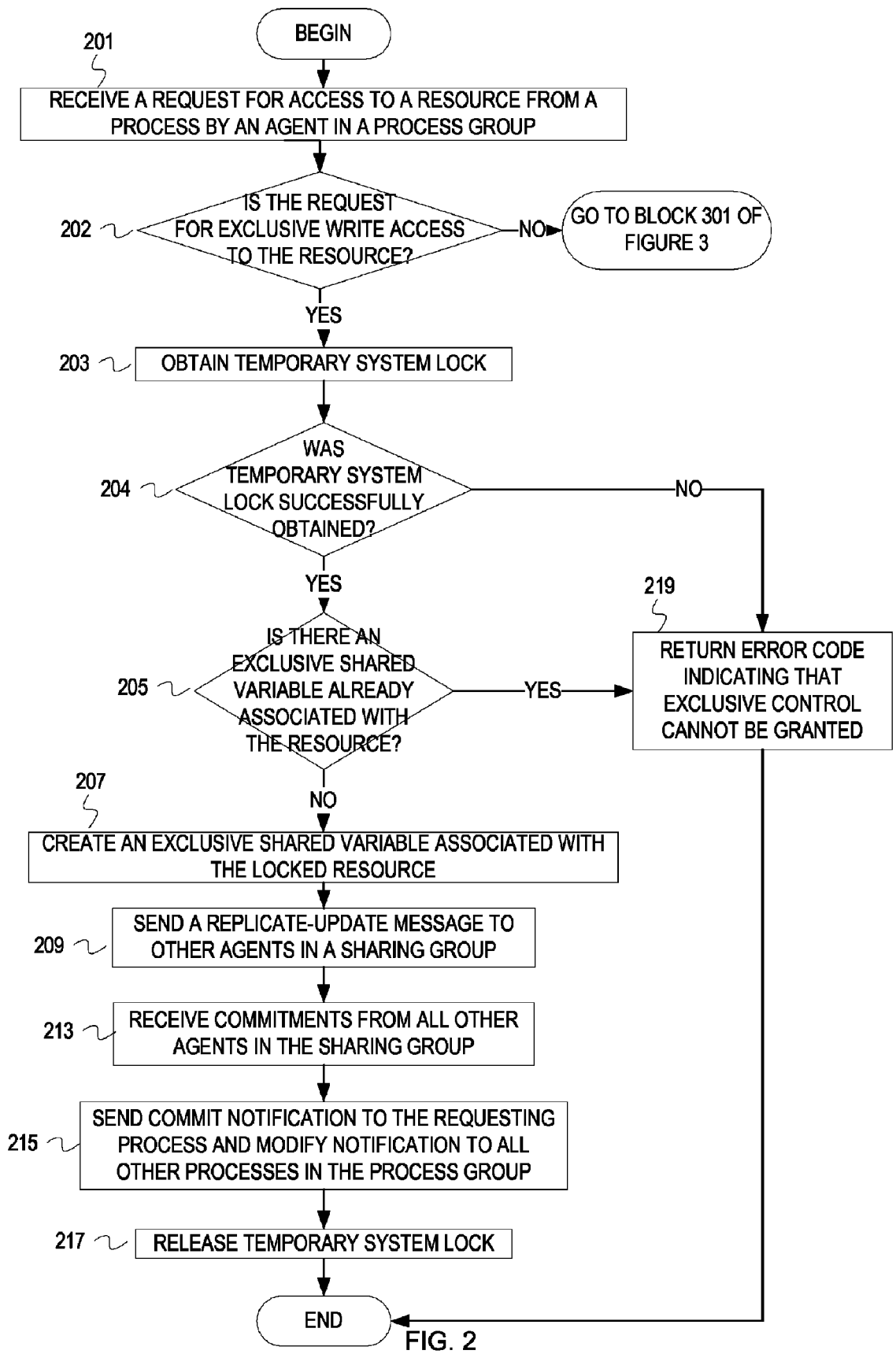
FIGS. 2-3 are flowcharts depicting example operations for creating an exclusive shared variable for a resource.
Figure 3:
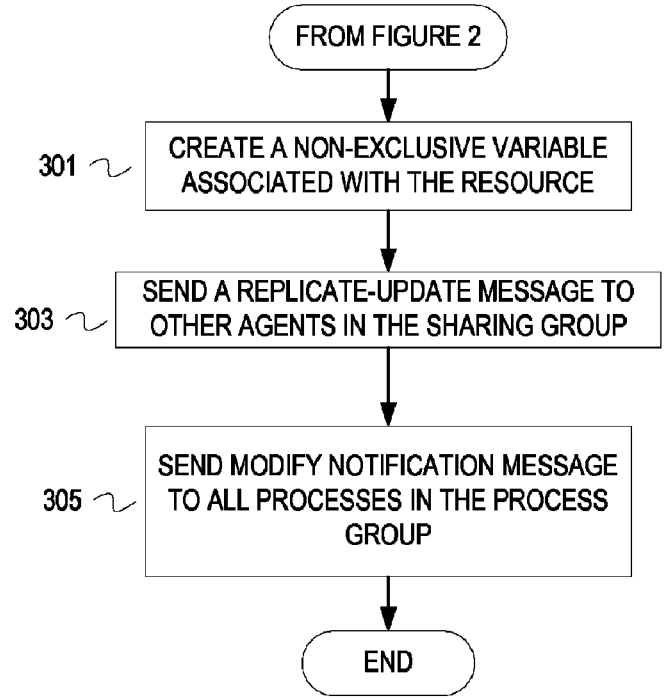

FIGS. 2-3 are flowcharts depicting example operations for creating an exclusive shared variable for a resource. Flow begins at block 201, where a request for access to a resource from a process is received by an agent in a process group. For example, the process sends a request by executing a command INGXVP SET, VAR, E, pool1, var1 defined by an API. The parameter 'E' means that the variable is exclusive. The name, var1, can be any name, but is unique within the pool, pool1.

At block 202, it is determined if the request was for exclusive write access to the resource. If exclusive write access was requested, flow continues at block 203. If exclusive write access was not requested, flow continues at block 301 of FIG. 3.

At block 203, a temporary system lock is obtained. The temporary system lock prevents the resource from being modified while an exclusive shared variable is being created.

At block 204, it is determined if the temporary system lock was successfully obtained. A temporary system lock cannot be obtained if another process has already created a system lock for the resource. If the temporary system lock was obtained, flow continues at block 205. If the temporary system lock was not obtained, flow continues at block 219.

At block 205, it is determined if an exclusive shared variable is already associated with the resource. If an exclusive shared variable is not associated with the resource, flow continues at block 207. If an exclusive shared variable is associated with the resource, flow continues at block 219. Embodiments can also implicitly or explicitly ensure that the name of the shared variable is unique within a given pool.

At block 207, an exclusive shared variable associated with the locked resource is created in the process group based on the request.

At block 209, a replicate-update message is sent to other agents in a sharing group. In response to receiving a replicate-update message, an agent performs operations depicted in FIG. 4 to replicate the exclusive shared variable for a local process group of the agent.

At block 213, the agent receives commitments from all other agents in the sharing group. When commitments have been received from each of the other agents in the sharing group, the exclusive shared variable has been successfully created across the sharing group and flow continues at block 215.

At block 215, a commit notification is sent to the requesting process and a modify notification is sent to all other processes in the process group. The commit notification informs the requesting process that it has been granted exclusive write access to the resource. The modify notification informs the other processes in the process group that the exclusive shared variable associated with the resource has been created.

At block 217, the temporary system lock is released and flow ends.

At block 219, an error code indicating that exclusive control cannot be granted is returned.

FIG. 3 depicts a flowchart of operation that continues from the flowchart depicted by FIG. 2. At block 301, a non-exclusive shared variable associated with the resource is created in the process group based on the request.

At block 303, a replicate-update message is sent to other agents in the sharing group. In response to receiving a replicate-update message, an agent performs operations depicted in FIG. 4 to replicate the non-exclusive shared variable for a local process group of the agent.

At block 305, a modify notification message is sent to all processes in the process group. The modify notification informs all processes, including the requesting processes, in the process group that the non-exclusive shared variable has been created.

Figure 4:
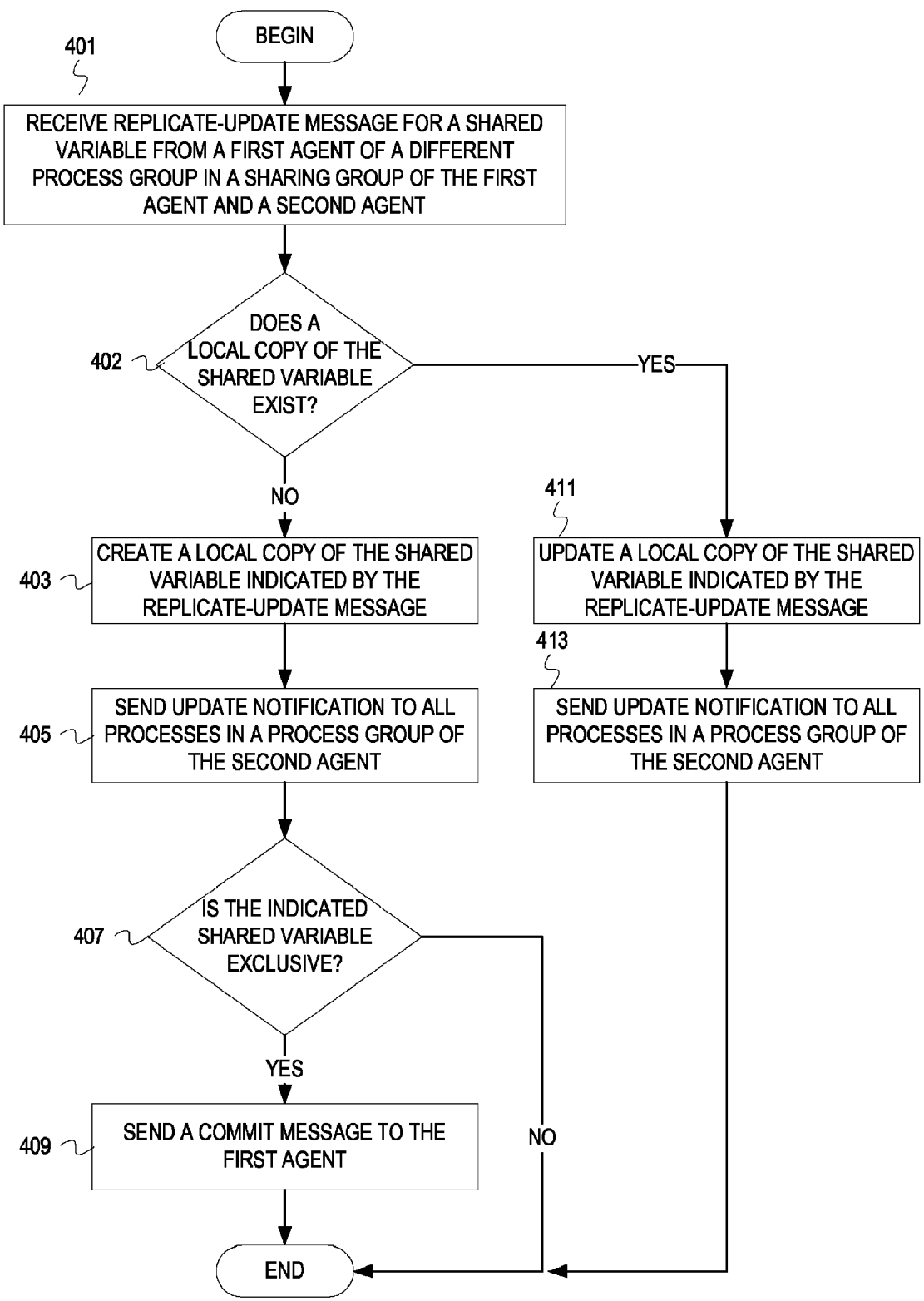
FIG. 4 is a flowchart depicting example operations for an agent's response to creation or modification of a shared variable.

FIG. 4 is a flowchart depicting example operations for an agent's response to creation or modification of a shared variable. Flow begins at block 401, where a replicate-update message for a shared variable from a first agent in a sharing group is received by a second agent.

At block 402, it is determined if a local copy of the shared variable exists. If the local copy of the shared variable does not exist, flow continues at block 403. If the local copy of the shared variable exists, flow continues at block 411.

At block 403, a local copy of the shared variable indicated by the replicate-update message is created by the second agent.

At block 405, an update notification is sent by the second agent to all processes in a process group of the second agent.

At block 407, it is determined if the indicated shared variable is exclusive. If the indicated shared variable is exclusive, flow continues at block 409. If the indicated shared variable is not exclusive, flow ends.

At block 409, a commit message is sent to the first agent by the second agent to notify the first agent that the exclusive shared variable was successfully created in the process group of the second agent and flow ends.

At block 411, a local copy of the shared variable indicated by the replicate-update message is updated by the second agent.

At block 413, an update notification is sent by the second agent to all processes in the process group of the second agent and flow ends.

Figure 5:
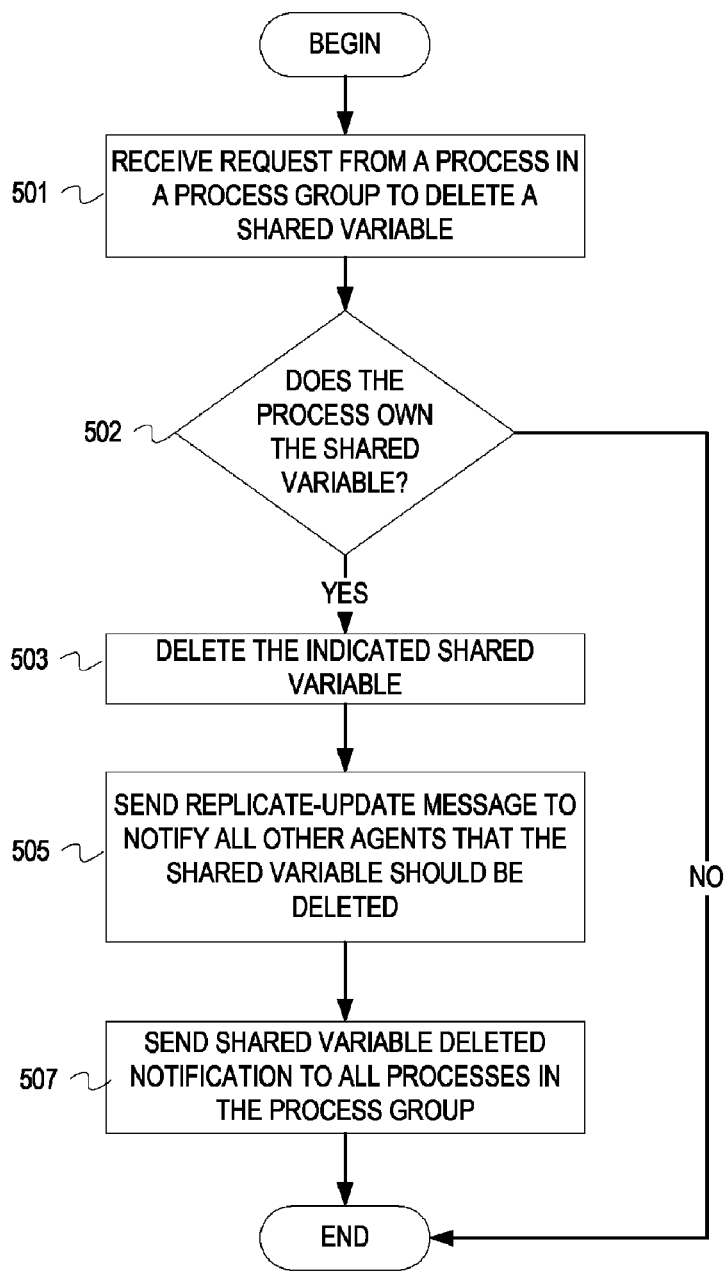
FIG. 5 is a flowchart depicting example operations for deleting a shared in response to a request by a process.

Shared variables may be deleted as well as created. A shared variable may be deleted when a process requests it be deleted, when a process terminates, when an agent leaves a sharing group, etc. FIG. 5 is a flowchart depicting example operations for deleting a shared variable in response to a request by a process. Flow begins at block 501, where a request is received from a process in a process group to delete a shared variable by an agent in the process group.

At block 502, it is determined if the process owns the shared variable. A process owns a shared variable if the shared variable is associated with the name of the process. For example, the owner of a shared variable may be indicated with a group name and application name. If the process owns the shared variable, flow continues at block 503. If the process does not own the shared variable, flow ends.

At block 503, the indicated shared variable is deleted in the process group.

At block 505, a replicate-update message is sent to notify all other agents in a sharing group that the shared variable should be deleted. In response, the other agents in the sharing group delete local copies of the shared variable in their respective process groups. Each of the other agents notifies one or more processes in its respective process group that the shared variable was deleted.

At block 507, a shared variable deleted notification is sent to all processes in the process group by the agent and flow ends.

Figure 6:
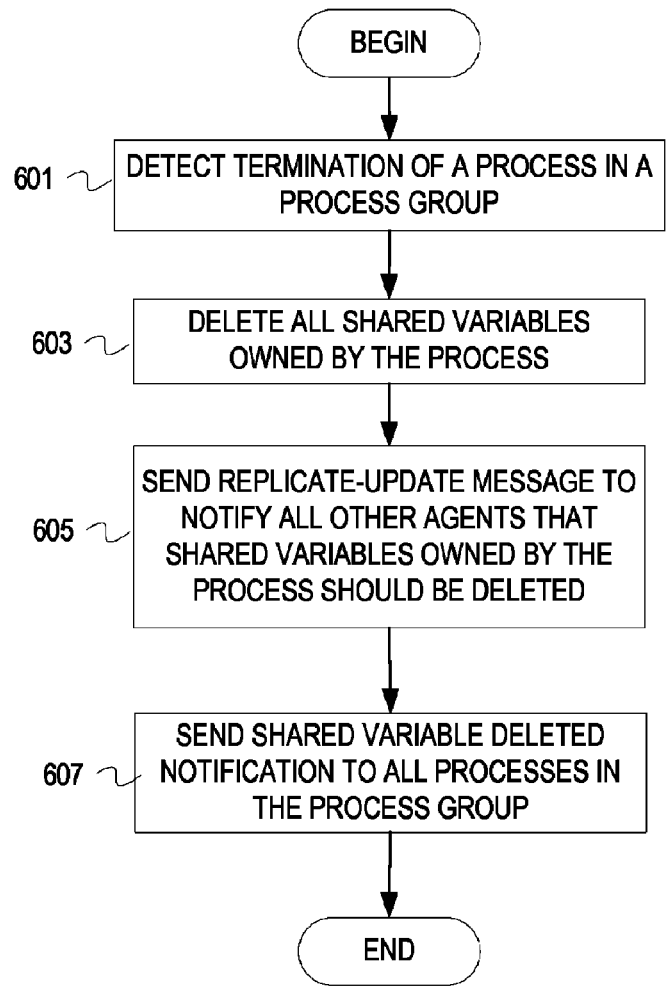
FIG. 6 is a flowchart depicting example operations for deleting a shared variable in response termination of a process.

FIG. 6 is a flowchart depicting example operations for deleting a shared variable in response termination of a process. Flow begins at block 601, where termination of a process in a process group is detected by an agent in the process group.

At block 603, all shared variables owned by the process are deleted.

At block 605, a replicate-update message is sent to notify all other agents in a sharing group that all shared variables owned by the process terminated (or being terminated) should be deleted. Notification for all shared variables that should be deleted may be sent in batch in a single replicate-update message or individual replicate-update messages may be sent for each individual shared variable that should be deleted. In response to the replicated-updated message all other agents in the sharing group delete local copies of the one or more indicated shared variables in their respective process groups. Each of the other agents notifies one or more processes in its respective process group that the one or more shared variables were deleted.

At block 607, a shared variable deleted notification is sent to all processes in the process group by the agent and flow ends.

Figure 7:
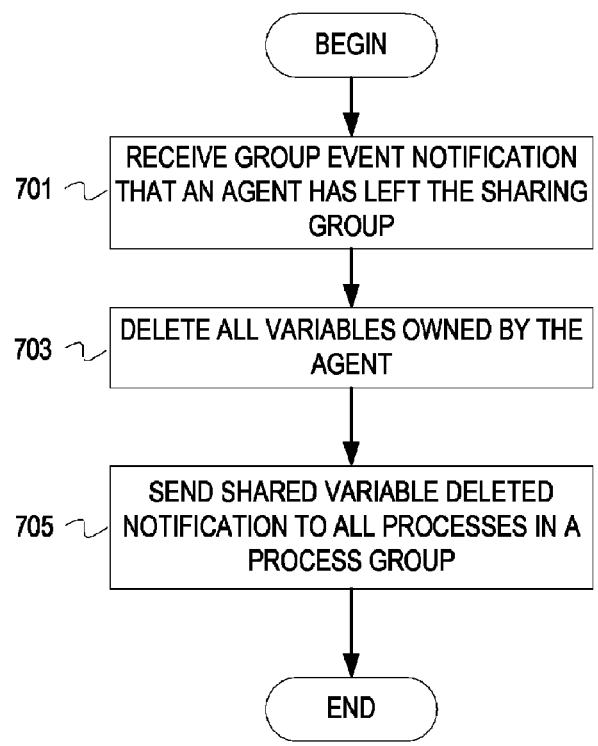
FIG. 7 is a flow chart depicting example operations for deleting a shared variable in response to an agent leaving a sharing group.

FIG. 7 is a flow chart depicting example operations for deleting a shared variable in response to an agent leaving a sharing group. Flow begins at block 701, where a group event notification that a first agent has left a sharing group is received by a second agent. An example event that causes an agent to leave a sharing group includes a last process of the first agent's process group terminating. An event notification service detects that the last process terminated and sends a group event notification to all other agents in the sharing group.

At block 703, all variables owned by the first agent are deleted by the second agent.

At block 705, a shared variable deleted notification is sent by the second agent to all processes in a process group of the second agent. Notification for all shared variables that were deleted may be sent in batch in a single shared variable deleted notification or individual shared variable deleted notifications may be sent for each individual shared variable that was deleted.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the operation for sending modify notifications to all other processes in the process group may occur after the operation for creating the local copy of the exclusive shared variable. Referring to FIG. 3, the operation for sending the replicate-update message to other agents in the sharing group and the operation for sending the modify notification message to all other processes in the process group could be interchanged.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM; magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
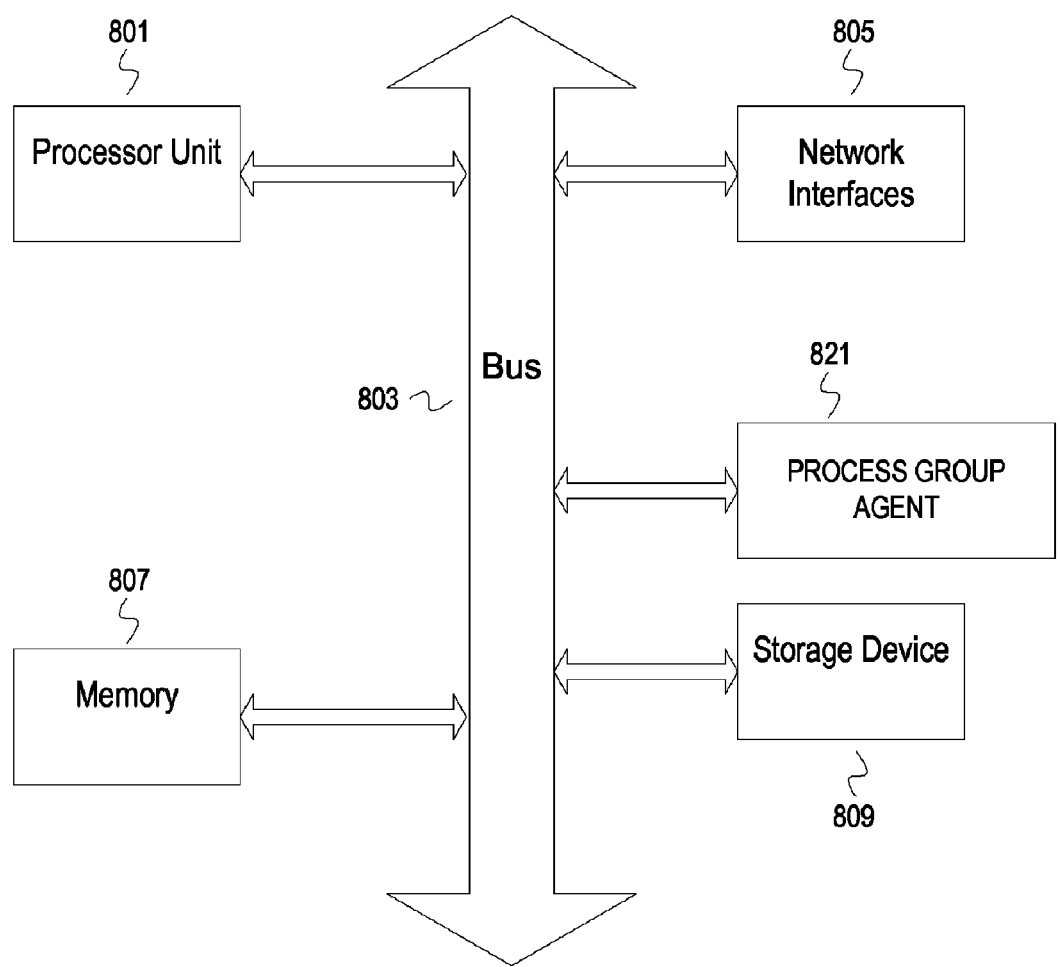
FIG. 8 depicts an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The computer system also includes a process group agent 821 that manages shared variables for a process group. The process group agent 821 creates an exclusive shared variable to allow a process exclusive access to the resource and notifies other process group agents in a sharing group that the exclusive shared variable has been created. Any one of these functionalities may be partially (or entirely) implemented in hardware and/or on the processing unit 801. For example, the functionality may be implemented with a process specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for managing cluster-wide resources with shared variables as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    a first agent receiving a request for exclusive write access to a resource, wherein the request is received from a first process running in a first process group, wherein the first agent is a member of a sharing group;
    obtaining a temporary system lock on the resource for the first process;
    creating an exclusive shared variable for the first process, wherein the exclusive shared variable is associated with the resource and the first process at least initially has exclusive write access to the resource associated with the exclusive shared variable while allowing processes in a second process group read access to the exclusive shared variable;
    sending a replication message to a second agent associated with the second process group to cause the second agent to create a copy of the exclusive shared variable, wherein the second agent is also a member of the sharing group;
    receiving a commitment from the second agent that indicates that the second agent has successfully created the copy of the exclusive shared variable;
    releasing the temporary system lock;
    the first agent notifying the first process that exclusive write access to the resource has been granted;
    determining that a third process in the first process group is requesting access to the resource associated with the exclusive shared variable; and
    sending an error message to the third process, wherein the error message indicates that exclusive access to the resource cannot be granted.

2. The method of claim 1, wherein the third process requesting access to the resources associated with the exclusive shared variable comprises the third process requesting creation of a second variable having a same name as the exclusive shared variable.

3. The method of claim 1, wherein the first agent notifying the first process that exclusive write access to the resource has been granted further comprises:
    determining that a third process should be notified that the exclusive shared variable was created based on a property of the exclusive shared variable; and
    notifying the third process in the process group that the exclusive shared variable was created.

4. The method of claim 1 further comprising:
the second agent, in response to creating the copy of the exclusive shared variable, determining that an update notification should be sent to one or more processes in the second process group based on a property of the exclusive shared variable, wherein the update notification notifies the one or more processes that the exclusive shared variable was created;
sending an update notification to the one or more processes in the second process group; and
sending the commitment to the first agent.

5. The method of claim 1 further comprising:
the first agent receiving a request for read access to a second resource from a third process running in the first process group;
creating a non-exclusive shared variable for the third process, wherein the non-exclusive shared variable is associated with the second resource, wherein the third process has read access to the resource associated with the exclusive shared variable;
sending a replication message to the second agent associated with the second process group to cause the second agent to create a copy of the non-exclusive shared variable; and
the first agent notifying the first and third processes that the non-exclusive variable was created.

6. The method of claim 1 further comprising:
detecting that a shared variable should be deleted in the first process group;
deleting the shared variable in the first process group;
requesting that a copy of the shared variable be deleted in the second process group; and
notifying one or more processes in the first process group that the shared variable has been deleted.

7. The method of claim 6, wherein said detecting that the shared variable should be deleted in the first process group further comprises one of receiving a request from a process in the first process group to delete the shared variable, detecting that a process has terminated, and detecting that an agent has left a sharing group.

8. The method of claim 6 further comprising:
the second agent receiving the request to delete the copy of the shared variable in the second process group;
deleting the copy of the shared variable; and
notifying one or more processes in the second process group that the copy of the shared variable has been deleted.

9. One or more non-transitory machine-readable media having stored therein a program product, which when executed by a set of one or more processor units causes the set of one or more processor units to perform operations that comprise:
a first agent receiving a request for exclusive write access to a resource, wherein the request is received from a first process running in a first process group, wherein the first agent is a member of a sharing group;
obtaining a temporary system lock on the resource for the first process;
creating an exclusive shared variable for the first process, wherein the exclusive shared variable is associated with the resource and the first process at least initially has exclusive write access to the resource associated with the exclusive shared variable while allowing processes in a second process group read access to the exclusive shared variable;
sending a replication message to a second agent associated with the second process group to cause the second agent to create a copy of the exclusive shared variable, wherein the second agent is also a member of the sharing group;
receiving a commitment from the second agent that indicates that the second agent has successfully created the copy of the exclusive shared variable;
releasing the temporary system lock;
the first agent notifying the first process that exclusive write access to the resource has been granted;
determining that a third process in the first process group is requesting access to the resource associated with the exclusive shared variable; and
sending an error message to the third process, wherein the error message indicates that exclusive access to the resource cannot be granted.

10. The non-transitory machine-readable media of claim 9, wherein the third process requesting access to the resources associated with the exclusive shared variable comprises the third process requesting creation of a second variable having a same name as the exclusive shared variable.

11. The non-transitory machine-readable media of claim 9, wherein the first agent notifying the first process that exclusive write access to the resource has been granted further comprises:
determining that a third process should be notified that the exclusive shared variable was created based on a property of the exclusive shared variable; and
notifying the third process in the process group that the exclusive shared variable was created.

12. The non-transitory machine-readable media of claim 9, wherein the operations further comprise:
the second agent, in response to creating the copy of the exclusive shared variable, determining that an update notification should be sent to one or more processes in the second process group based on a property of the exclusive shared variable, wherein the update notification notifies the one or more processes that the exclusive shared variable was created;
sending an update notification to the one or more processes in the second process group; and
sending the commitment to the first agent.

13. The non-transitory machine-readable media of claim 9, wherein the operations further comprise:
the first agent receiving a request for read access to a second resource from a third process running in the first process group;
creating a non-exclusive shared variable for the third process, wherein the non-exclusive shared variable is associated with the second resource, wherein the third process has read access to the resource associated with the exclusive shared variable;
sending a replication message to the second agent associated with the second process group to cause the second agent to create a copy of the non- exclusive shared variable; and
the first agent notifying the first and third processes that the non-exclusive variable was created.

14. The non-transitory machine-readable media of claim 9, wherein the operations further comprise:
detecting that a shared variable should be deleted in the first process group;
deleting the shared variable in the first process group;
requesting that a copy of the shared variable be deleted in the second process group; and
notifying one or more processes in the first process group that the shared variable has been deleted.

15. The non-transitory machine-readable media of claim 14, wherein said detecting that the shared variable should be deleted in the first process group further comprises one of receiving a request from a process in the first process group to delete the shared variable, detecting that a process has terminated, and detecting that an agent has left a sharing group.

16. The non-transitory machine-readable media of claim 14, wherein the operations further comprise:
- the second agent receiving the request to delete the copy of the shared variable in the second process group;
- deleting the copy of the shared variable; and
- notifying one or more processes in the second process group that the copy of the shared variable has been deleted.

17. An apparatus comprising:
- a set of one or more processing units;
- a network interface; and
- a process group agent operable to perform operations that comprise:
- a first agent receiving a request for exclusive write access to a resource, wherein the request is received from a first process running in a first process group, wherein the first agent is a member of a sharing group;
- obtaining a temporary system lock on the resource for the first process;
- creating an exclusive shared variable for the first process, wherein the exclusive shared variable is associated with the resource and the first process at least initially has exclusive write access to the resource associated with the exclusive shared variable while allowing processes in a second process group read access to the exclusive shared variable;
- sending a replication message to a second agent associated with the second process group to cause the second agent to create a copy of the exclusive shared variable, wherein the second agent is also a member of the sharing group;
- receiving a commitment from the second agent that indicates that the second agent has successfully created the copy of the exclusive shared variable;
- releasing the temporary system lock;
- the first agent notifying the first process that exclusive write access to the resource has been granted;
- determining that a third process in the first process group is requesting access to the resource associated with the exclusive shared variable; and
- sending an error message to the third process, wherein the error message indicates that exclusive access to the resource cannot be granted.

18. The apparatus of claim 17, wherein the process group agent comprises one or more non-transitory machine-readable media.

\* \* \* \* \*